United States Patent [19]

Leimkühler

[11] Patent Number: 4,533,522
[45] Date of Patent: Aug. 6, 1985

[54] APPARATUS FOR THE DESULFURIZATION OF FLUE GASES

[75] Inventor: Jürgen Leimkühler, Essen, Fed. Rep. of Germany

[73] Assignee: Gottfried Bischoff Bau kompl. Gasreinigungs- und Wasserrückkühlanlagen GmbH & Co. Kommanditgesellschaft, Essen, Fed. Rep. of Germany

[21] Appl. No.: 539,614

[22] Filed: Oct. 6, 1983

[30] Foreign Application Priority Data

Oct. 6, 1982 [DE] Fed. Rep. of Germany ....... 3236905

[51] Int. Cl.³ .............................................. B01J 10/00
[52] U.S. Cl. ...................................... 422/170; 55/223; 55/244; 55/267; 422/172; 422/175; 422/193; 422/194; 422/234; 423/242

[58] Field of Search ............... 422/169, 172, 175, 189, 422/193, 194, 234, 170; 55/222, 223, 244, 267; 423/242 R

[56] References Cited

U.S. PATENT DOCUMENTS

| | | |
|---|---|---|
| 2,843,217 | 7/1958 | Von Linde ...................... 423/242 R |
| 3,593,497 | 7/1971 | Grimm et al. ................... 423/242 R |
| 3,997,294 | 12/1976 | Kritzler ................................. 422/175 |
| 4,147,756 | 4/1979 | Dahlstrom et al. ................. 422/169 |

Primary Examiner—Michael S. Marcus
Attorney, Agent, or Firm—Karl F. Ross; Herbert Dubno

[57] ABSTRACT

A rotary heat exchanger surmounts a scrubbing tower provided with two scrubbing columns through which the flue gas of fossil fuel combustion is passed in succession so that the rotary heat storage mass of the regenerative heat exchanger is heated by the incoming flue gas and the flue gas cooled in the scrubbing columns is reheated by the rotary heat storage mass as it leaves the tower.

5 Claims, 2 Drawing Figures

APPARATUS FOR THE DESULFURIZATION OF FLUE GASES

CROSS REFERENCE TO RELATED APPLICATIONS

This application is related to the commonly assigned co-pending applications Ser. Nos. 493,984 and 515,919 filed May 12, 1983 and July 20, 1983, respectively.

FIELD OF THE INVENTION

The present invention relates to the desulfurization of flue gases and, more particularly, to and apparatus for the desulfurization of such flue gases. More particularly, the invention relates to the desulfurization of flue gases using a scrubbing operation in the presence of a calcium compound so that the sulfur components of the flue gases, especially power plant flue gases is removed in the form of calcium sulfate dihydrate which can be recovered from scrubbing liquid. The invention thus relates to an apparatus for treating glue gases to produce calcuim sulfate dihydrate.

BACKGROUND OF THE INVENTION

It is known, in the after treatment of power plant boiler flue gases, generally from coal fired power plants but also form power plants fired with other fossil fuels, to provide a scrubbing process in which a calcium compound such as lime or limestone is added to the scrubbing liquid or is otherwise provided in the gas stream adapted to contact the scrubbing liquid so that the scrubbing operation results in the generation of calcium sulfate dihydrate by the reaction of the calcium containing compound with sulfur compounds in the flue gases, usually sulfur oxides.

The calcium sulfate dihydrate which is thus formed can be recovered and can be usefully applied or treated for use as a building material in the form of gypsum or gypsum products.

In this technology it is known to utilize two flue gas scrubbing columns which are combined with an inlet for the flue gas and an outlet for the scrubbed gases and means for circulating a scrubbing liquid through the columns and for recovering calcium sulfate dihydrate from the scrubbing liquid.

In these two-column systems, a first of the scrubbing columns forms a first desulfurization stage in which the scrubbing is carried out in an acid state of the scrubbing liquid, i.e. a pH of the scrubbing liquid in the acid range. The other scrubbing column carries out a second desulfurization stage with the pH of the scrubbing liquid in a higher or more basic range.

The flue gas to be desulfurized is initially passed through the acid scrubbing column and then traverses the basic scrubbing column before being discharged. The acid scrubbing column is operated with air or oxygen addition and the calcium sulfate dihydrate can be extracted from the sump product of this column.

When I describe a basic scrubbing column, it should be understood that I intended thereby to describe a scrubbing column which is operated with a pH of the scrubbing liquid that is higher than the pH of the first or acid scrubbing column, even if this pH is not necessarily wholly in the basic range in the classic sense, i.e. even if the pH may be somewhat below 7.

In conventional scrubbing plants of the latter type, the two columns are disposed one behind the other in immediate succession and in practice it is possible to form the two columns as distinct stages in a single tower.

The two columns can be provided one above another in the scrubbing tower and the upper flue gas scrubbing column can be operated in the basic pH range while the lower column is operated in the acid pH range.

The scrubbing liquor from the upper scrubbing column can pass downwardly through a sludge separation stage to partly enter the lower scrubbing column. In practice, the flue gas to be desulfurized is introduced into the lower scrubbing column and passes from it upwardly through the upper scrubbing column, being removed from the top of the tower.

The desulfurized flue gas leaves the upper scrubbing column at a temperature of 50° C. or less. From a point of view of environmental protection, this is undesirable since flue gases in such low temperatures cannot be discharged into the atmosphere from tall stacks. They consequently must be reheated in special apparatus at comparatively high cost with an environmental detriment in the sense that the reheaters must be operated with combustion of additional fossil fuels.

It has also been suggested to provide a heat exchanger for the incoming flue gas to enable sensible heat to be extracted therefrom and to utilize the sensible heat to reheat the desulfurized flue gas as it leaves the scrubbing tower. An indirect heat exchanger of this type is comparatively costly and the passages through which the flue gas is discharged tend to become contaminated with deposits which can be cleaned only with considerable difficulty and cost. These deposits are usually gypsum or gypsum compositions.

OBJECTS OF THE INVENTION

It is the principal object of the present invention to provide an improved apparatus which can be operated more reliably and at lower cost than earlier scrubbing installations for the purposes described and which can facilitate the reheating of the scrubbed flue gas before it is released from the apparatus.

Another object of the invention is to overcome the drawbacks of the above described method and apparatus, and, more particularly, to provide an improved method of scrubbing a flue gas, particularly from a fossil-fuel power plant boiler, whereby the aforementioned disadvantages are obviated.

It is also an important object of the present invention to provide an improved method of operating a scrubbing installation in which the flue gases of fossil-fuel power plants can be desulfurized with the production of calcium sulfate dihydrate and without the disadvantages of earlier approaches.

SUMMARY OF THE INVENTION

These objects are attained, in accordance with the present invention by providing the two scrubbing columns side by side and especially where the scrubbing columns so oriented that the inlet for the flue gas to be scrubbed and the outlet for the flue gas which has been desulfurized are located side by side and, indeed, open substantially at a common plane, preferably a horizontal plane.

According to the invention, a rotary regenerative heat exchanger is provided between the scrubbing columns and the inlet/outlet means, this heat exchanger having a rotary heat storage mass which, as each portion is contacted by the incoming flue gas to be heated thereby, is rotated so that heated portions of the storage mass then encounter the desulfurized flue gas passing in the opposite direction through the heat exchanger to the flue gas outlet.

Since the same surfaces which are cooled by the desulfurized flue gas are heated and swept by the hot imcoming flue gas, deposits which may tend to form in one stage are removed in the other stage as the rotary storage mass passes cyclically between the two stages and the surfaces are repeatedly and cyclically swept by the incoming hot flue gas. According to a feature of the invention, below the regenerative heat exchanger and under the heat storage mass thereof, rinsing nozzles can be provided at the flue gas inlet side for contacting the incoming flue gas with the scrubbing liquid at the flue gas inlet of the regenerative heat exchangers. Moreover, an air or oxygen inlet can be provided for the introduction of additional air or oxygen which at the same time serves to remove deposits from the heat storage mass.

The invention is based upon my discovery that, utilizing a regenerative heat exchanger with a rotating storage mass, I am able not only to heat up the outgoing desulfurized flue gas, but also to prevent completely any long term development of deposits on the heat exchanger mass. Apparently, the reheating of the heat storage mass cyclically by the incoming flue gas, any rinsing operation or the addition of air at the inlet side of the regenerative heat exchanger can completely eliminate the build up of any such deposits. Customarily the use of rinsing and air introduction is not necessary since the incoming flue gas completely frees the surfaces from any deposits which may have formed upon a previous passage through the reheating zone of the heat exchanger.

Naturally, for this result to be obtained, the rotating mass must be driven or rotated at such a speed that the deposits can be removed, i.e. that the deposits do not bake on to a point that they cannot be removed in a pass through the heating zone of the heat exchanger.

Surprisingly, even with such rotation of the mass, the desulfurized flue gas can be reheated to a temperature sufficient to enable it to be discharged from a stack without difficulty.

In preferred mode of operating the apparatus of the invention, the flue gas to be desulfurized is passed through the heating stage of the regenerative heat exchanger at a temperature of about 130° C. and leaves the heat exchanger at a temperature of about 80° C. The flue gas from the scrubbing column enters the regenerative heat exchanger at a temperature of about 50° C. and is heated therein to a temperature of about 100° C., leaving the regenerative heat exchanger at this latter temperature.

It is thus not necessary in the system of the invention to mix the desulfurized flue gas with untreated flue gas as is the case in many systems in which the temperature of the gas to be discharged into the atmosphere must be raised. Best results are obtained when the acidic column is operated at a pH in the range of 3 to 6 while the basic column is operated in a pH above the pH in the acid column but in the range of 5 to 8. Under these operating conditions, the calcium sulfate is generated in the form of the $\zeta$-semihidrate crystals which can be easily removed from the regenerative heat exchanger so that the entire system can operate continuously without downtime for maintenance or cleaning.

The most preferred regenerative heat exchangers are those commercially available as the Ljungstrom system regenerative heat exchangers using cellular heat storage masses.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
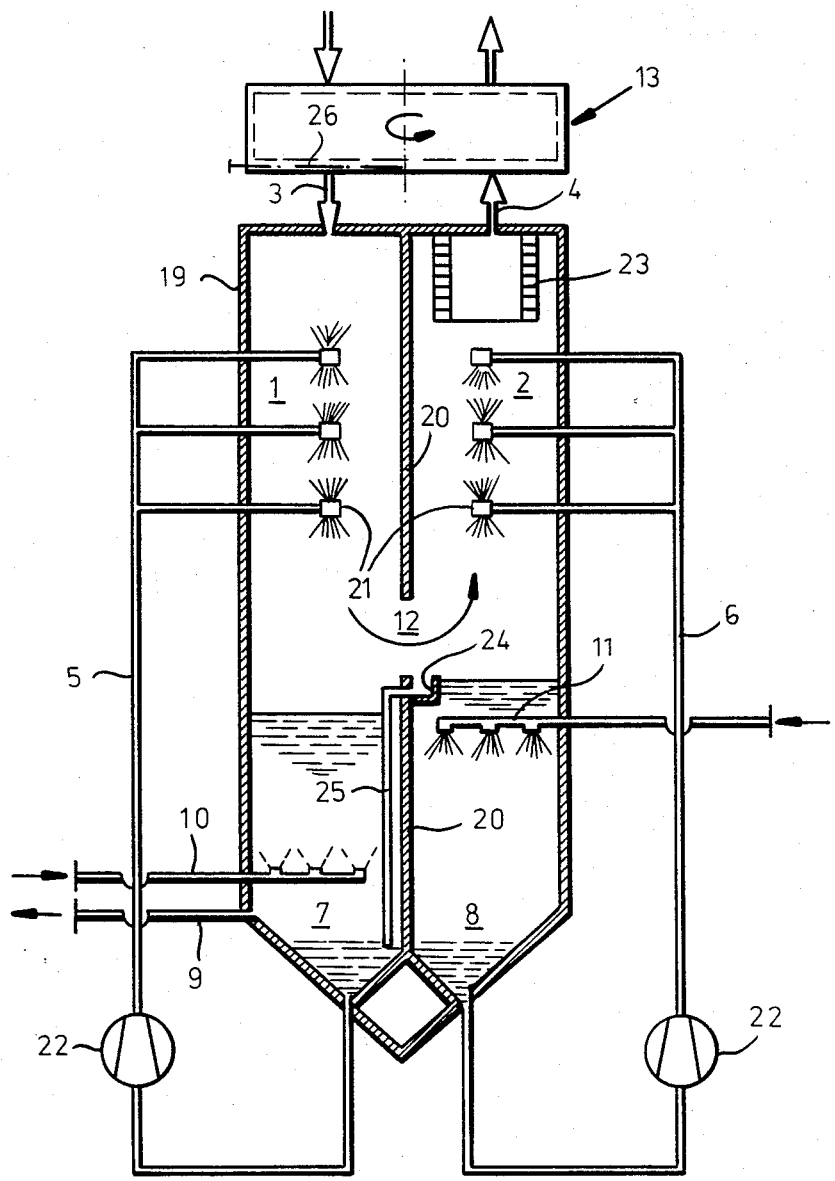
FIG. 1 is a vertical diagrammatic cross section through a scrubbing system according to the invention with the regenerative heat exchanger being shown only schematically and in elevation.

The apparatus shown diagrammatically in FIG. 1 for the desulfurization of a flue gas, especially a flue gas from a fossil-fuel power plant boiler, comprises two scrubbing columns 1 and 2, disposed side by side in a common scrubbing tower, means 3 for the introduction of the flue gas into the scrubbing column, means 4 for the discharge of scrubbed flue gas from the column, each of these means being a respective duct or fitting communicating with the tower.

In addition, the scrubber comprises a scrubbing liquid circulation 5, 6 with respective sumps 7, 8 in the columns 1, 2 and means for introducing the scrubbing liquid for withdrawing calcium sulfate dihydrate, the latter means being represented by the duct 9.

The first column 1 serves as an acid scrubbing column, operating at an acid pH while the second column 2 serves as a second stage desulfurization column operating at a basic pH of the scrubbing liquid.

The flue gas to be scrubbed is introduced initially into the first stage column 1 and passes as represented by the arrow 12 into the second stage column 2 from which it is discharged.

The sump 7 is provided with an oxygen inlet 10 for air or oxygen or a gas enriched in oxygen (see the aforementioned copending applications) and the calcium sulfate dihydrate is sedimented from the scrubbing liquid in the sump and is withdrawn.

The scrubbing liquid which can be a water/limestone mixture, i.e. a suspension of limestone in water, can be introduced by the nozzles 11 into the basic scrubbing column 2.

The two scrubbing columns 1, 2 are disposed side by side and are so arranged that the inlet 3 and the outlet 4 for the flue gas to be scrubbed and the scrubbed flue gas, respectively, are also disposed side by side and open at the same level as shown in FIG. 1.

The inlet 3 and the outlet 4 are provided with a regenerative heat exchanger 13 having a rotating heat-storage mass 14 which is heated by the incoming flue gas before it enters the inlet 3 and which, upon rotation of the heated portions into alignment with the outlet 4, heats the desulfurized flue gas before it is discharged to the stack.

The regenerative heat exchanger is described in greater detail in connection with FIG. 2.

Figure 2:
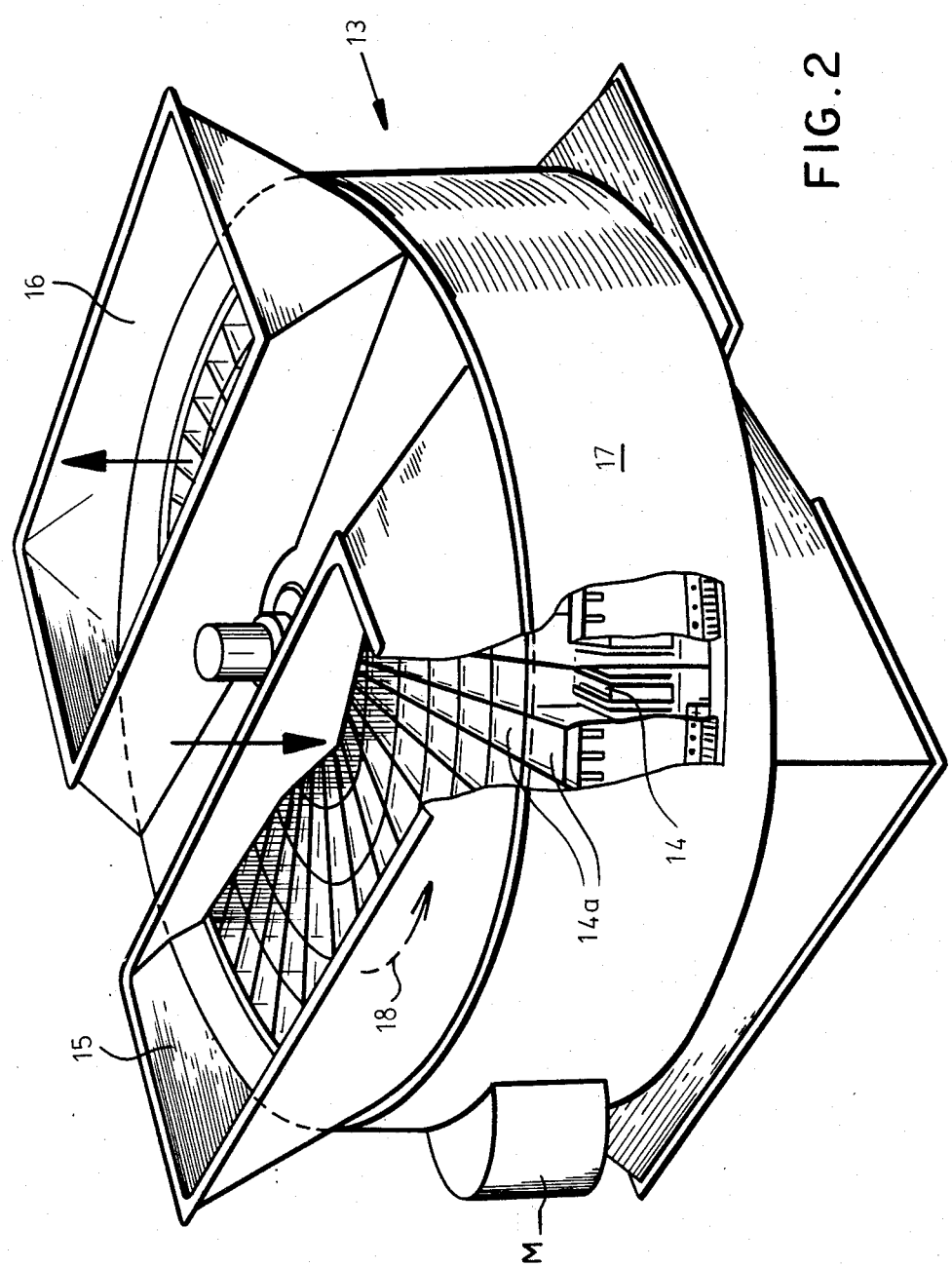
FIG. 2 is a greatly enlarged perspective view, partly broken away and also diagrammatically showing the regenerative heat exchanger which can be used in the system of FIG. 1.

From FIG. 2 it will be apparent that the regenerative heat exchanger 13 has an inlet 15 for the flue gas to be desulfurized and an outlet 16 for the desulfurized flue gas, the outlet 16 communicating with a stack.

The heat storage mass 14 is received in a housing 17 which has been partly broken away in FIG. 2 to show the interior. The direction of rotation is represented at 18 and the mass 14 can be driven by a motor as represented at M or can have its cells 14a so pitched that the passage of gas therethrough induces rotation of the heat storage mass.

As the heat storage mass transfers heat to the desulfurized flue gas, the cells 14a prevent mixture of the desulfurized flue gas with the oncoming flue gas. The deposits which may tend to form during the heating of the desulfurized flue gas are completely removed by the incoming flue gas.

The two columns 1, 2 are combined, as noted, in a unitary tower 19 having a central vertical wall or partition 20 which is interrupted at 12 to permit the transfer of the flue gas from the first column to the second. The scrubbing liquid can be sprayed into the respective columns via nozzles 21 which induce a turbulence and can be considered spin or optimizing nozzles. The nozzles are connected with pumps 22 which draw the scrubbing liquid from the respective sumps 7, 8 and feed the nozzles via the lines 5 and 6 as represented.

A droplet separator 23 can be provided in the second column 2 to remove entrained scrubbing liquid droplets from the desulfurized flue gas before it passes into the regenerative heat exchanger 13.

In an example representing the best mode of operating the apparatus shown in the drawing the flue gas is introduced at 15 at a temperature of 130° C. and passes from the regenerative heat exchanger 13 into the first column 1 at a temperature of 80° C. It is cooled in the columns 1, 2 to a temperature of 50° C. and at this temperature enters the heat exchanger 13 at the fitting 4. Within the regenerative heat exchanger the temperature of the scrubbed flue gas is raised to a 100° C. The pH in the first stage is maintained between 3 and 6 and is preferably about 4 whereas the pH in the second stage is maintained between 5 and 8 and is preferably about 7.5.

The basic column 2 is provided with an overflow 24 from which the scrubbing liquid from the sump 8 is permitted to flow via the downcomer 25 into the sump 7. As shown in dot-dash lines in FIG. 1, moreover, spray nozzles can be provided at 26 to direct a rinsing liquid, e.g. the scrubbing liquid from the first stage, unto the surfaces of the rotating storage mass 14 to assist in freeing the surfaces from deposits. This has been found not to interfere with the flue gas intake when the nozzles are directed to treat only a portion of the intake side sectors of the storge mass.

I claim:

1. An apparatus for desulfurizing a flue gas from fossil fuel combustion, comprising:
   means forming an acid scrubbing column having a sump and a basic scrubbing column in side by side relation with a flue gas inlet to said acid scrubbing column and a flue gas outlet from said basic scrubbing column disposed in side by side relationship in a common plane above said columns;
   means for treating flue gas in said acid scrubbing column with an acidic scrubbing liquid, for permitting flue gas to pass from said acid scrubbing column to said basic scrubbing column, and for treating flue gas in said basic scrubbing column with a scrubbing liquid at a pH higher than the pH of said acid scrubbing liquid, one of said scrubbing liquids at least containing a calcium compound whereby calcium sulfate dihydrate is formed;
   means connected with said sump of said acid-scrubbing column for admitting an oxygen-containing gas thereto and for removing calcium sulfate dihydrate therefrom;
   a regenerative heat exchanger having a rotating heat storage mass disposed at said plane above said columns and positioned so that said mass is heated by incoming flue gas admitted to said acid column and heats flue gas discharged from said basic column upon rotation of said mass from alignment with said inlet into alignment with said outlet; and
   means in said heat exchanger for rinsing deposits from said mass with said acid scrubbing liquid above said acidic scrubbing column.

2. The apparatus defined in claim 1 wherein said columns are formed in a single scrubbing tower.

3. The apparatus defined in claim 2 wherein said tower is provided with a partition separating said columns from one another.

4. The apparatus defined in claim 3 wherein the last mentioned means includes nozzles directing a stream of scrubbing liquid on limited surfaces of said mass.

5. The apparatus defined in claim 4 wherein said mass is a cellular structure having cells which register with said inlet and with said outlet upon rotation of said mass.

* * * * *